US011477013B2

(12) United States Patent
Shao

(10) Patent No.: US 11,477,013 B2
(45) Date of Patent: Oct. 18, 2022

(54) METHODS AND DEVICES FOR CRYPTOGRAPHIC KEY MANAGEMENT BASED ON BLOCKCHAIN SYSTEM

(71) Applicant: Alipay (Hangzhou) Information Technology Co., Ltd., Zhejiang (CN)

(72) Inventor: Jiayi Shao, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/950,380

(22) Filed: Nov. 17, 2020

(65) Prior Publication Data

US 2021/0167952 A1 Jun. 3, 2021

Related U.S. Application Data

(63) Continuation of application No. PCT/CN2019/121942, filed on Nov. 29, 2019.

(51) Int. Cl.
*H04L 9/08* (2006.01)
*G06F 16/23* (2019.01)
(Continued)

(52) U.S. Cl.
CPC ........ *H04L 9/0827* (2013.01); *G06F 16/2379* (2019.01); *G06Q 20/3825* (2013.01);
(Continued)

(58) Field of Classification Search
None
See application file for complete search history.

(56) References Cited

U.S. PATENT DOCUMENTS 5,892,900 A * 4/1999 Ginter .................... G06F 21/10
726/26
8,577,803 B2 * 11/2013 Chatterjee ............ G06Q 20/386
705/41
(Continued)

FOREIGN PATENT DOCUMENTS

CN 1965280 A 5/2007
CN 101552018 A 10/2009
(Continued)

OTHER PUBLICATIONS

SIPO The First Office Action PCT Entering National Phase (Year: 2022).*
(Continued)

*Primary Examiner* — Mohammad A. Nilforoush
*Assistant Examiner* — Dennis G Keritsis
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for managing a cryptographic key. One of the methods includes: receiving a request for a signature on transaction data; allocating a key manager corresponding to the request; and obtaining, by the key manager, the signature on the transaction data and the cryptographic key, wherein the cryptographic key is a public key, and the signature on the transaction data is obtained based on a private key corresponding to the public key.

15 Claims, 8 Drawing Sheets

(51) Int. Cl.
  *G06Q 20/38*   (2012.01)
  *G06Q 20/40*   (2012.01)
  *G06Q 40/02*   (2012.01)
  *H04L 9/06*    (2006.01)
  *H04L 9/30*    (2006.01)
  *H04L 9/32*    (2006.01)
  *H04L 9/00*    (2022.01)

(52) U.S. Cl.
  CPC ....... *G06Q 20/3829* (2013.01); *G06Q 20/401* (2013.01); *G06Q 40/02* (2013.01); *H04L 9/0637* (2013.01); *H04L 9/0643* (2013.01); *H04L 9/0825* (2013.01); *H04L 9/30* (2013.01); *H04L 9/3247* (2013.01); *H04L 9/3297* (2013.01); *G06Q 2220/00* (2013.01); *H04L 9/50* (2022.05)

(56) References Cited

U.S. PATENT DOCUMENTS

| | | | |
|---|---|---|---|
| 10,346,618 | B1 | 7/2019 | Ah Kun et al. |
| 2002/0116619 | A1 | 8/2002 | Maruyama et al. |
| 2004/0088646 | A1* | 5/2004 | Yeager .................. H04L 67/04 715/229 |
| 2006/0294378 | A1 | 12/2006 | Lumsden et al. |
| 2014/0254796 | A1 | 9/2014 | Li et al. |
| 2015/0026049 | A1* | 1/2015 | Theurer ................. G06Q 20/28 705/41 |
| 2015/0120569 | A1* | 4/2015 | Belshe ................. G06Q 20/065 705/71 |
| 2015/0332256 | A1* | 11/2015 | Minor .................. G06Q 20/381 705/69 |
| 2017/0070486 | A1* | 3/2017 | Lyons ................. H04L 63/0442 |
| 2018/0191503 | A1* | 7/2018 | Alwar .................. H04L 9/0637 |
| 2018/0262341 | A1* | 9/2018 | Cheng .................. H04L 9/0877 |
| 2019/0005470 | A1* | 1/2019 | Uhr ....................... H04L 9/3268 |
| 2019/0013931 | A1* | 1/2019 | Benini .................. H04L 9/3033 |
| 2019/0180275 | A1 | 6/2019 | Safak |
| 2019/0280864 | A1* | 9/2019 | Cheng ........................ H04L 9/30 |
| 2019/0280882 | A1* | 9/2019 | Kodera .................... G06F 21/33 |
| 2021/0083872 | A1* | 3/2021 | Desmarais ......... G06Q 20/3825 |

FOREIGN PATENT DOCUMENTS

| | | | | |
|---|---|---|---|---|
| CN | 104468094 | A | 3/2015 | |
| CN | 104850795 | A | 8/2015 | |
| CN | 108476139 | A | 8/2018 | |
| CN | 110020857 | A | 7/2019 | |
| WO | WO 2019/179534 | A2 | 9/2019 | |
| WO | WO-2019179534 | A2 * | 9/2019 | ............. G06F 21/31 |
| WO | WO 2019/218055 | A1 | 11/2019 | |
| WO | WO-2019218055 | A1 * | 11/2019 | ............. G06F 21/74 |

OTHER PUBLICATIONS

NF U.S. Appl. No. 17/105,734 (Year: 2021).*
Extended European Search Report in European Application No. 19884849.1, dated Feb. 12, 2021.
International Search Report in Application No. PCT/CN2019/121942, from the National Intellectual Property Administration, PRC, dated Aug. 26, 2020.
Written Opinion of the International Search Authority in International Application No. PCT/CN2019/121942, dated Aug. 26, 2020.
Examination Report for European Application No. 19 884 849.1, dated Sep. 24, 2021.
Office Communication of European Application No. 19 884 849.1 dated Mar. 17, 2022.
Supplemental Search Report for Chinese Application No. 2019800058126, dated Jul. 12, 2022.

* cited by examiner

METHODS AND DEVICES FOR CRYPTOGRAPHIC KEY MANAGEMENT BASED ON BLOCKCHAIN SYSTEM

CROSS REFERENCE TO RELATED APPLICATIONS

This application is a continuation of International Application No. PCT/CN2019/121942, filed Nov. 29, 2019, the entire content of which is incorporated herein by reference.

TECHNICAL FIELD

The specification relates generally to computer technologies, and more particularly, to methods and devices for managing cryptographic key based on a blockchain system.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

A blockchain based transaction generally needs one or more digital signatures from signature authorities related to the transaction. A digital signature can be given using a cryptographic key. In a conventional cryptographic key management system, a user may create an account in a central intermediary (e.g., a centralized key management service) using a user-chosen password, and the central intermediary may manage cryptographic keys for the user.

SUMMARY

In one embodiment, there is provided a computer-implemented method for managing a cryptographic key, the method including: receiving a request for a signature on transaction data; allocating a key manager corresponding to the request; and obtaining, by the key manager, the signature on the transaction data and the cryptographic key, wherein the cryptographic key is a public key, and the signature on the transaction data is obtained based on a private key corresponding to the public key.

In another embodiment, there is provided a device for managing cryptographic keys, the device including: one or more processors; and one or more computer-readable memories coupled to the one or more processors and having instructions stored thereon that are executable by the one or more processors to: receive a request for a signature on transaction data; allocate a key manager corresponding to the request; and obtain the signature on the transaction data and the cryptographic key, wherein the cryptographic key is a public key, and the signature on the transaction data is obtained based on a private key corresponding to the public key.

In another embodiment, there is provided a non-transitory computer-readable medium having stored therein instructions that, when executed by a processor of a device, cause the device to perform a method for managing a cryptographic key, the method including: receiving a request for a signature on transaction data; allocating a key manager corresponding to the request; and obtaining, by the key manager, the signature on the transaction data and the cryptographic key, wherein the cryptographic key is a public key, and the signature on the transaction data is obtained based on a private key corresponding to the public key.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
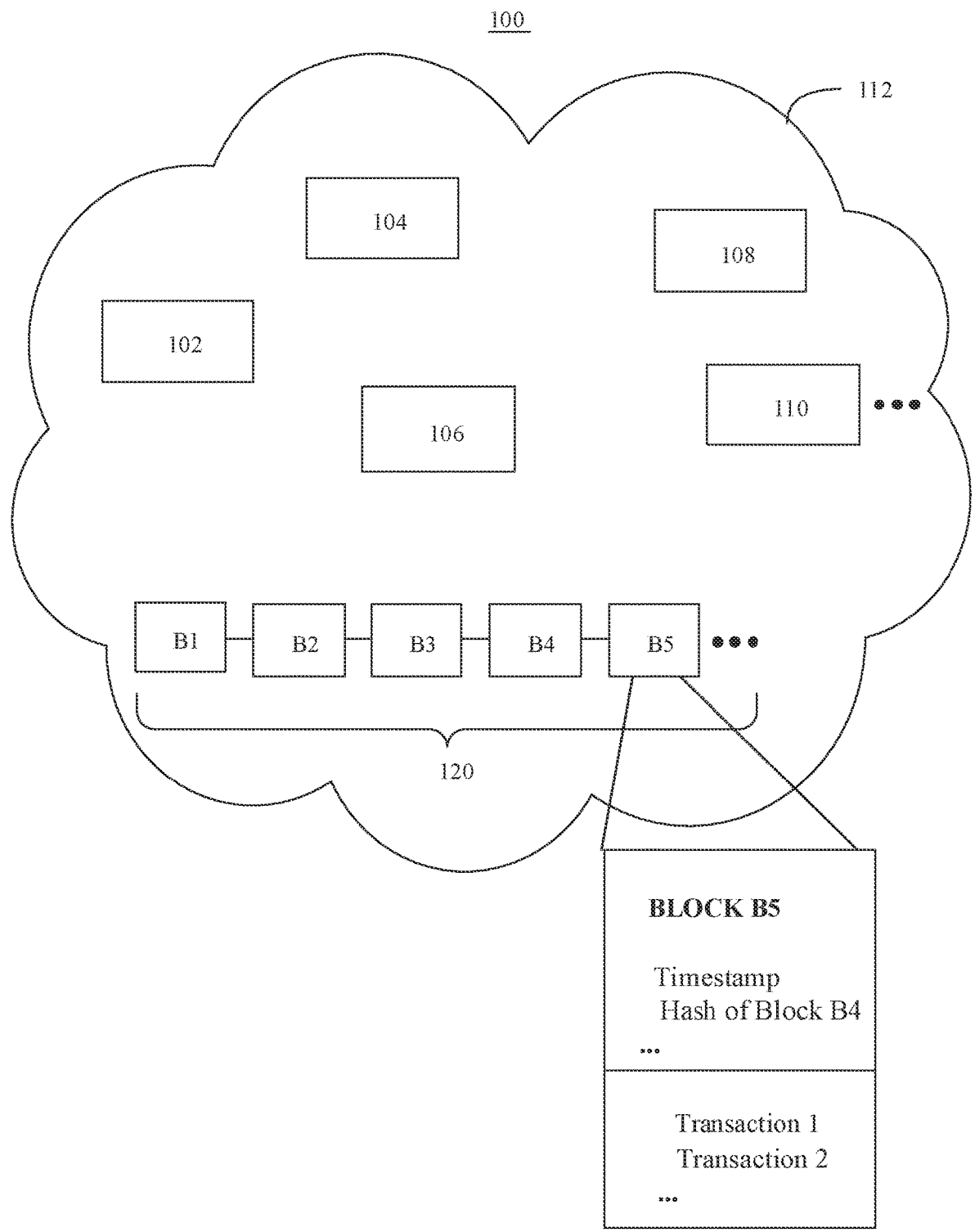
FIG. 1 is a schematic diagram of a blockchain system, according to an embodiment.

Embodiments of the specification provide methods and devices for managing a cryptographic key and obtaining a signature on transaction data. In the methods, a computer system may receive a request for a signature on transaction data, analyze parameters included in the request, and allocate a unique key manager based on the analysis. The allocated key manager may obtain the signature on the transaction data and a cryptographic key from a signature authority. The computer system may further reformat the obtained signature so that the signature can be compatible to any type of blockchain systems and any formats of smart contracts in the blockchain systems. The computer system may upload the reformatted signature to a blockchain system so that the signature can be verified in the blockchain system. The computer system may further update a user account database based on the signature and the cryptographic key.

Embodiments disclosed in the specification have one or more technical effects. In some embodiments, the methods and devices may manage a cryptographic key and obtain a signature on transaction data for a user. This allows for the user to perform a transaction and access an account of the user with a user-chosen password, without maintaining a cryptographic key, thereby providing convenience to the user and facilitating the transaction. In some embodiments, the obtained signature on the transaction data may be verified in a blockchain system, rather than by a central entity. This allows for decentralization of the transaction, leading to an enhanced security for the transaction. In some embodiments, the methods and devices reformat the obtained signature on the transaction data according to a type of the blockchain system and a format of a smart contract in the blockchain system. This allows for the verification of the signature to be performed in any type of blockchain systems or with any formats of smart contracts in the blockchain system, enhancing flexibility of the transaction. In some embodiments, the methods and devices may allocate a unique key manager to the transaction by adopting an idempotent control protocol. This prevents unnecessary processing of the signature request by multiple key managers, further enhancing security and efficiency of the transaction.

A blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. In a public blockchain network, the consensus process is controlled by nodes of the consensus network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block in order for the block to be validated and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. Ina consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be validated and added to the blockchain. In some examples, at least a sub-set of entities (nodes) (e.g., at least 7 entities) must sign every block in order for the block to be validated and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system configured to store a copy of the blockchain 120, or may be software running on the computing device, such as a process or an application. Each of the nodes 102-110 may have a unique identifier. The nodes 102-110 may communicate with one another by a wired or wireless communication. Such communication may adopt a reliable protocol such as a Transmission Control Protocol/Internet Protocol (TCP/IP).

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block 134, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

In an embodiment, the blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also, for example, the smart contract may include a plurality of subroutines or functions, each of which may be a sequence of program instructions that performs a specific task. The smart contract may be operational code that is fully or partially executed without human interaction.

Figure 2:
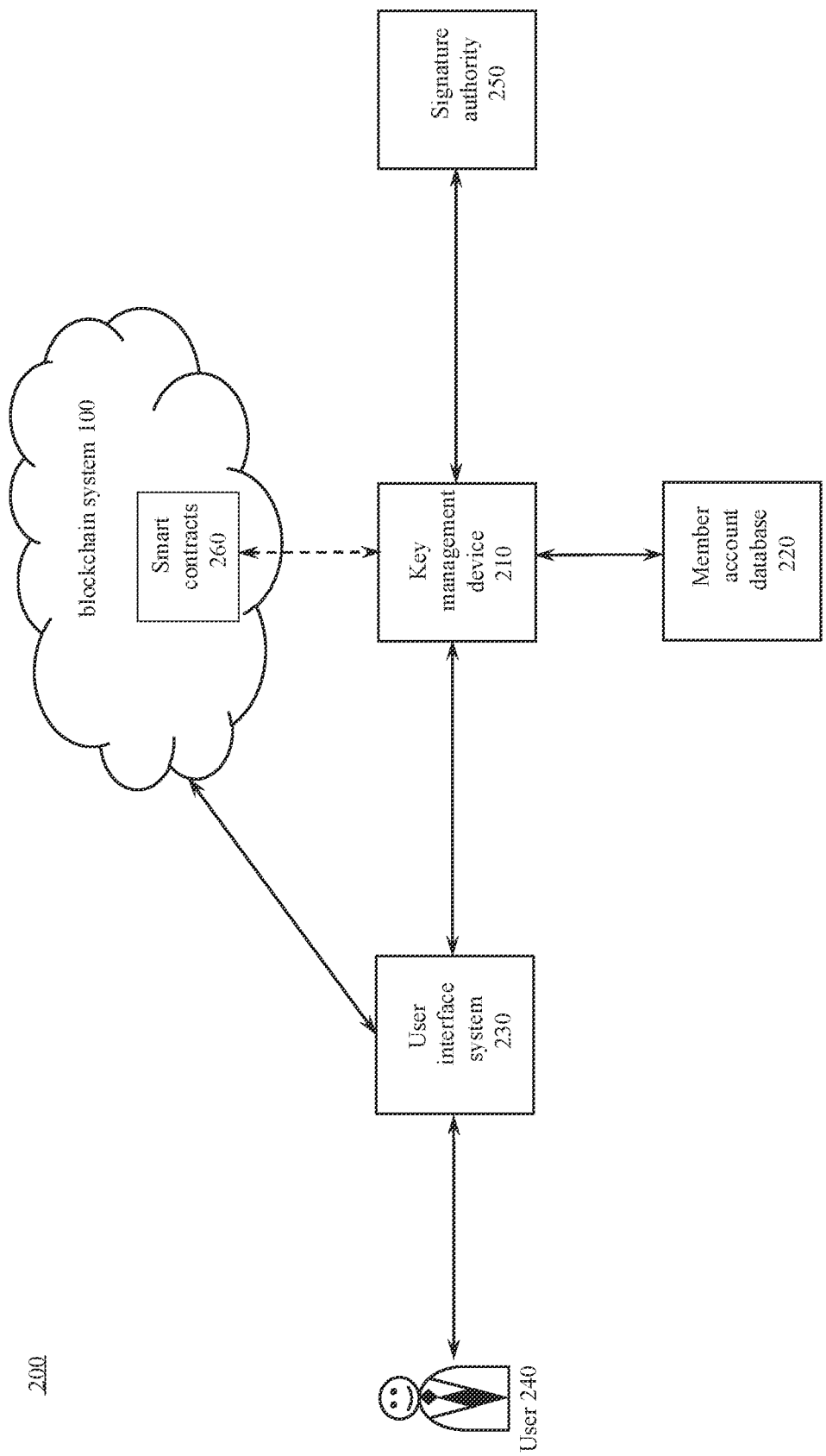
FIG. 2 is a schematic diagram of a system for managing a cryptographic key and obtaining a signature on transaction data, according to an embodiment.

FIG. 2 is a schematic diagram illustrating a key management system 200 for managing a cryptographic key and obtaining a signature on transaction data, according to an embodiment. Referring to FIG. 2, the key management system 200 may include a key management device 210, a member account database 220, a user interface system 230, and a signature authority 250. The key management system 200 may communicate with the blockchain system 100 (FIG. 1). In some embodiments, the key management system 200 may operate as a node of the blockchain system 100. In other embodiments, the key management system 200 may not operate as a node of the blockchain system 100.

In some embodiments, the user interface system 230 may be implemented as a transaction system of a user 240, and the key management device 210 may be a third-party agent that manages cryptographic keys for multiple users, including the user 240. In these embodiments, the user interface system 230 may also include an accounting system that obtains and records transaction data of the user 240. The member account database 220 may be implemented in the key management device 210.

In other embodiments, the user interface system 230 may be a third-party transaction data system that manages transaction data for multiple users, including the user 240. The user 240 may create an account the user interface system 230 using a user-chosen password. The key management device 210 may be implemented in the user interface system 230 or may be independent from the user interface system 230. The member account database 220 may be implemented in the key management device 210 or in the user interface system 230.

The user 240 can be any entity, for example, but is not limited to, an individual person, a corporation, a representative of a corporation, a financial institution, a research institution or a government entity that are involved in a transaction. The user interface system 230 may obtain, assemble and maintain transaction data for the user 240.

The signature authority 250 may be a party that is authorized to provide a full signature or a partial signature on transaction data. The signature authority 250 can be any entity, for example, but is not limited to, an individual personal, a corporation, a representative of a corporation, a financial institution, a research institution or a government entity that are involved in a transaction. The signature authority 250 may or may not be related to the user 240. The signature authority 250 may include a plurality of signature authorities that are independent from each other.

In an embodiment, the user 240 may perform a transaction and the transaction data needs to be signed by the signature authority 250. The user interface system 230 may assemble the transaction data and send the transaction data with a request for a signature to the key management device 210. In some embodiments, the signature request may include parameters related to the user 240. The parameters may include, but are not limited to, information of an account of the user 240 in the key management device 210, information of a bank account of the user 240, information of a cryptographic key management system of the user 240, and association of the user 240 with a key management service, etc. In an embodiment, the key management service may be a third-party agent that manages cryptographic keys for multiple users, such as the user 240.

In an embodiment, upon receipt of the signature request from the user interface system 230, the key management device 210 may analyze the parameters included in the signature request. The key management device 210 may further determine whether the user 240 is an existing user of the key management device 210 or a new user. If the user 240 is a new user, the key management device 210 may update the member account database 220 by opening a member account for the user 240. In an embodiment, the key management device 210 may open the member account for the user 240 using an identification and a password provided by the user 240. On the other hand, if the user 240 is an existing user of the key management device 210, the key management device 210 may extract information regarding the user 240 from the member account database 220.

In an embodiment, the key management device 210 may include multiple key managers (not shown) that can process the signature request. For example, each key manager may include a subroutine or function, which may be a sequence of program instructions that performs a specific task. Based on the analysis of the parameters included in the signature request, the key management device 210 may allocate a proper key manager for processing the signature request. In some embodiments, the allocated key manager may be a key manager that can obtain a signature and a cryptographic key from the signature authority 250. In other embodiments, the allocated key manager may be a key manager that can generate a mock cryptographic key and sign the transaction data using the generated mock cryptographic key. In an embodiment, the key management device 210 is not a signature authority, and the generating the mock cryptographic key and providing a mock signature is for the purpose of testing the key management device 210. The cryptographic key may include a single key (e.g., a public key) or multiple keys (e.g., a private key and a public key).

In an embodiment, the key management device 210 may allocate a unique key manager to transaction data of a user by adopting an idempotent control protocol. In this embodiment, when the key management device 210 analyzes the signature request accompanied by the transaction data, the key management device 210 may always allocate the same key manager to that transaction data or for that user. This prevents handling of the transaction data by multiple key managers and fraudulent obtaining of an invalid signature, thereby enhancing security and efficiency of the transaction.

In an embodiment, the allocated key manager may initiate contact with the signature authority 250 to obtain the signature and a cryptographic key. After obtaining the signature, the key management device 210 may reformat the signature so that the signature can be adapted to a userpreferred type of a blockchain system or a specific format of a smart contract in the blockchain system. In some embodiments, the key management device 210 determines the type of the blockchain system or the format of the smart contract based on records of the user 240 in the member account database 220. In other embodiments, the type of the blockchain system or the format of the smart contract s included in the signature request transmitted from the user interface system 230, Reformatting the signature allows the user 240 to conveniently choose a type of a blockchain system or a format of a smart contract in verifying the signature on the blockchain system, providing convenience to the user and enhancing flexibility of the transaction.

In an embodiment, the key management device 210 may transmit the reformatted signature and the cryptographic key to the user interface system 230. In some embodiments, the key management device 210 may generate payload data with the reformatted signature, the original signature, and the cryptographic key and transmit the payload data to the user interface system 230.

In an embodiment, upon receipt of the signature and the cryptographic key (or the payload data), the user interface system 230 may create an account in the blockchain system 100 and upload the signature (or the payload data) to the blockchain system 100, so that the signature can be verified in the blockchain system. In an embodiment, in addition to the signature, the accuracy of the transaction data can also be verified in the blockchain system 100. In an embodiment, the verification of the signature may be performed based on a smart contract in the blockchain system 100.

In an embodiment, the verification of the signature may be performed based on a cryptography algorithm that provides a pair of keys including a private key and a public key. The private key may be associated with a particular party and may encrypt transaction data to form the signature. The public key may be provided to another party in the blockchain system to decrypt the encrypted data, to verify whether the transaction is indeed authorized by that particular party. This decryption may also be referred to as signature verification. In the embodiment, the blockchain system 100 may support a plurality of cryptography algorithms, such as an RSA (Rivest-Shamir-Adleman) algorithm, an Elliptic Curve Digital Signature Algorithm (ECDSA), an SM2 algorithm, and the like.

In an embodiment, the signature uploaded to the blockchain system 100 may be verified by other parties in the blockchain system 100, and the cryptographic key (e.g., a public key) obtained by the user interface system 230 may be provided to the other parties for the verification. By verifying the obtained signature in the blockchain system, rather than by a central entity, decentralization of the transaction data processing is achieved, leading to an enhanced security and efficiency of the transaction.

In an embodiment, the key management device 210 may update the account of the user 240 in the member account database 220 by recording the obtained signature and the cryptographic key in the member account database 220. The key management device 210 may further record the format of the reformatted signature sent to the user interface system 230. In this way, the key management device 210 may create and maintain a knowledge library for the user 240.

In an embodiment, the blockchain system 100 may notify the result of the verification by broadcasting or by sending a message to the user interface system 230. The user interface system 230 may further notify the user 240 the result of the processing of the signature request. In an embodiment, the user interface system 230 may further inform the user 240 information of the user account in the user interface system 230, for example, any remaining balance in the account of the user 240 after processing the transaction data. This allows the user 240 to conveniently manage an account with only a password, without maintaining cryptographic keys for the transaction data.

In an embodiment, the key management device 210 may include instructions stored in a computer system. The computer system may execute the instructions to perform the functions of the key management device 210. The user interface system 230 may be or may not be implemented in that computer system. In an embodiment, allocating a key manager of the key management device 210 may include specifying an address of the instructions corresponding to that key manager.

In an embodiment, the key management device 210 may be an independent hardware that includes integrated circuits and storage devices that may be compatible with any user interface systems. For example, the key management device 210 can interface with any other user interface systems.

Figure 3:
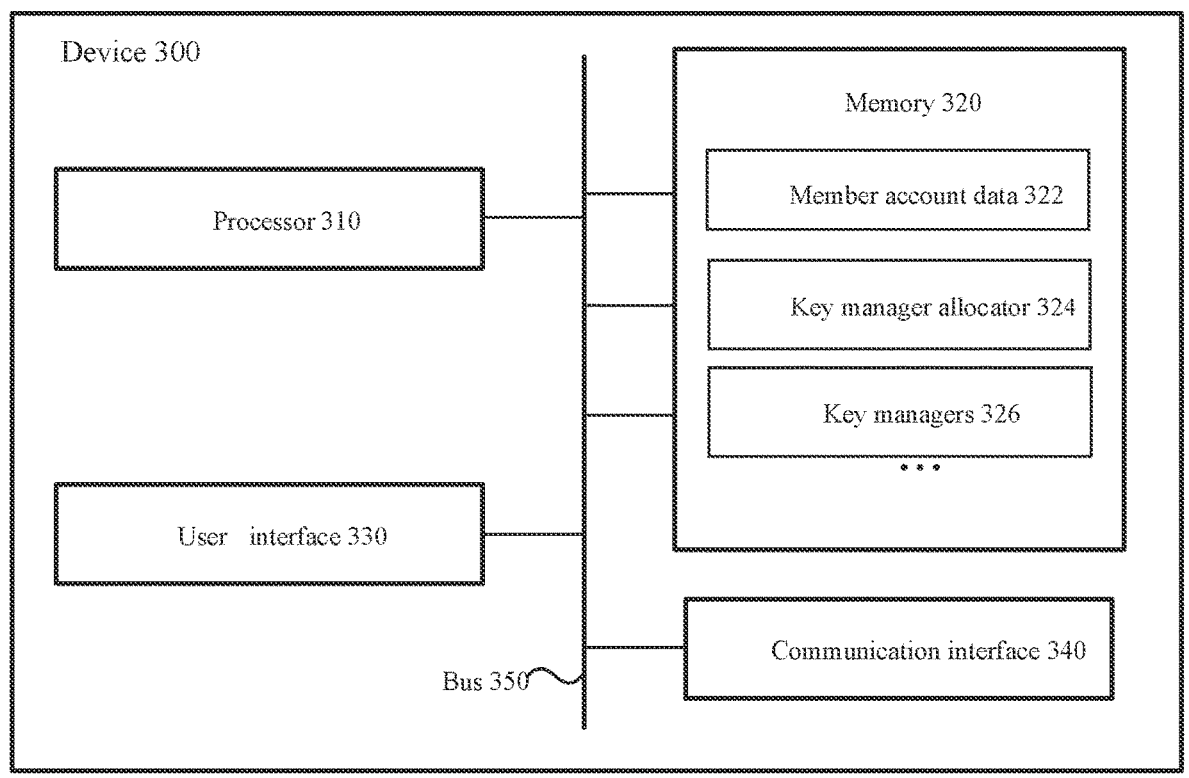
FIG. 3 is a schematic diagram of a device for managing a cryptographic key and obtaining a signature on transaction data, according to an embodiment.

FIG. 3 is a schematic diagram of a device 300 for managing a cryptographic key and obtaining a signature on transaction data, according to an embodiment. The device 300 may take any forms, including but not limited to, a desktop computer, a laptop computer, a server computer, a tablet, a smartphone, or a smart watch, or any other forms. The device 300 may include a processor 310, a memory 320, a user interface 330, and a communication interface 340 that communicate with one another through a bus 350.

The processor 310 may include one or more dedicated processing units, application-specific integrated circuits (ASICs), field-programmable gate arrays (FPGAs), or various other types of processors or processing units. The processor 310 is coupled with the memory 320 and may execute instructions stored in the memory 320.

The communication interface 340 may facilitate communications between the device 300 and the user interface systems and signature authorities, such as the user interface system 210 and the signature authority 250 (FIG. 2). In an embodiment, the communication interface 340 may receive a signature request and transaction data from a user interface system. The communication interface 340 may also send a request for a signature to a signature authority, receive a cryptographic key and the signature from the signature authority, and transmit the obtained signature and the cryptographic key to the user interface system.

In an embodiment, the communication interface 340 may support one or more communication standards, such as an Internet standard or protocol including the TCP/IP and TLS/SSL protocols, an Integrated Services Digital Network (ISDN) standard, etc. In an embodiment, the communication interface 340 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In an embodiment, the communication interface 340 may be based on public cloud infrastructure, private cloud infrastructure, and hybrid public/private cloud infrastructure.

The memory 320 may include a storage that stores member account data 322. The memory 320 may also store processor-executable instructions and data. The compo executable instructions and data may include a key manager allocator 324 and a plurality of key managers 326. The key manager allocator 324, when executed by the processor 310, allows the device 300 to extract and analyze parameters included in the signature request received from the user interface system, and allocate a proper key manager based on the analysis. In an embodiment, allocating the proper key manager may include specifying an address of that key manager. The allocated key manager, when executed by the processor 310, allows the device 300 to initiate a contact with a signature authority to obtain a cryptographic key and the signatures for the transaction data.

The memory 320 may be any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The user interface device 330 may include a display and an input device to transmit user command to the processor 310, etc. The display may display transaction data, an uploading progress, and a status of the blockchain system, etc. The display may include, but is not limited to, cathode ray tube (CRT), liquid crystal display (LCD), light-emitting diode (LED), gas plasma, a touch screen, or other image projection devices for displaying information to a user. The input device may be any type of computer hardware equipment used to provide data and control signals from a user to the processor 310. The input device may include, but is not limited to, a keyboard, a mouse, a scanner, a digital camera, a joystick, a trackball, cursor direction keys, a touchscreen monitor, or audio/video commanders, etc.

In an embodiment, the device 300 may include a user interface system, such as the user interface system 230 of FIG. 2, so that the processor 310 and the user interface 330 are part of the user interface system.

Figure 4:
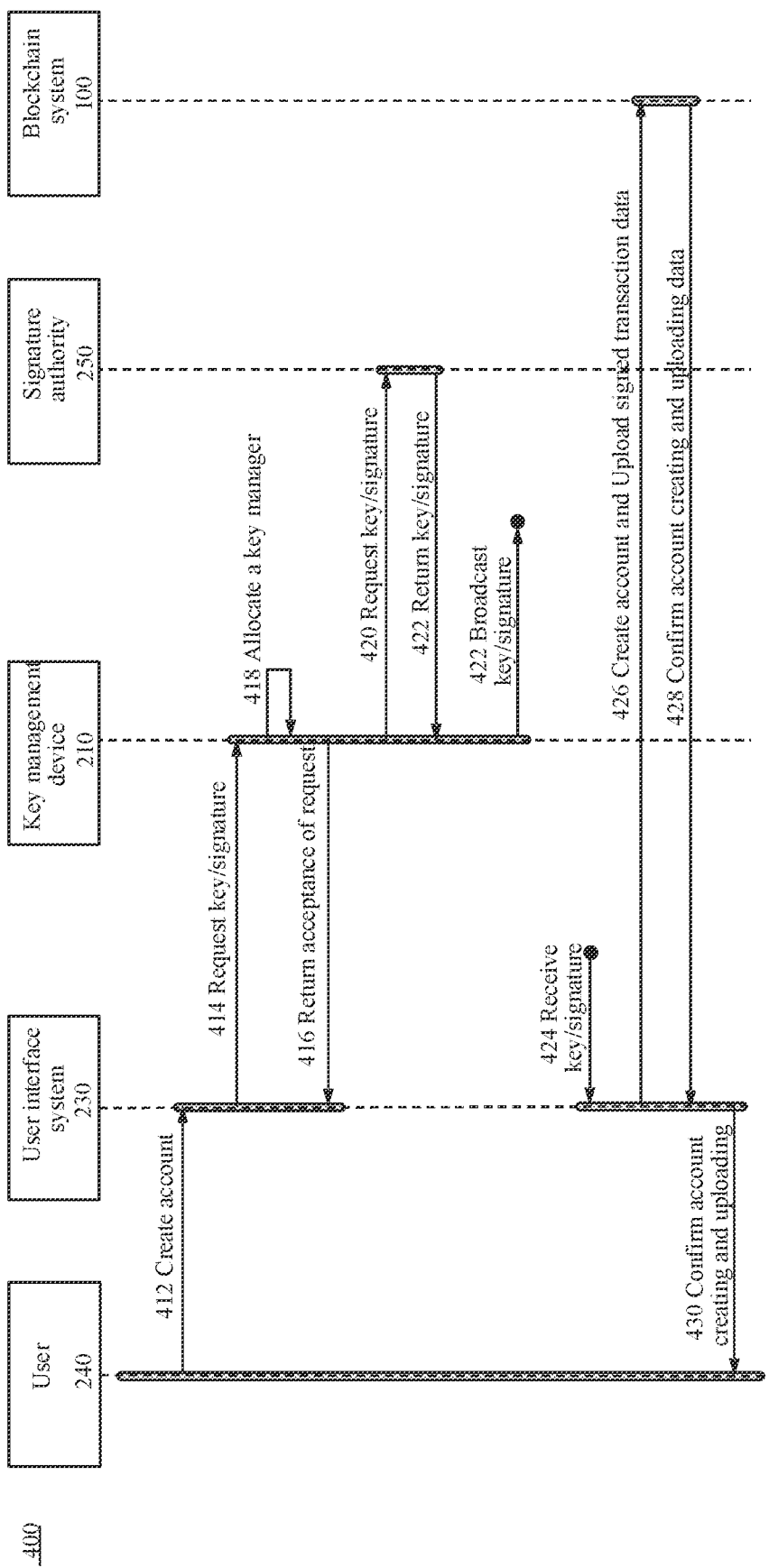
FIG. 4 is a schematic diagram of a method for managing a cryptographic key and obtaining a signature on transaction data, according to an embodiment.

FIG. 4 is a schematic diagram illustrating a method 400 for managing a cryptographic key and obtaining a signature on transaction data, according to an embodiment. Referring to FIGS. 2 and 4, the user 240 may create an account in the user interface system 230 (step 412). For example, the user 240 may create the account by providing a user-chosen password. In another embodiment, the user interface system 230 may be a transaction data system of the user 240, and there is no need for the user 240 to create an account in the user interface system 230. The user interface system 230 may obtain transaction data of the user 240, assemble the transaction data and maintain the transaction data for the user 240. The user interface system 230 may further send a request for a cryptographic key and a signature on transaction data to the key management device 210 (step 414). In an embodiment, the request may include the transaction data and parameters related to the user 240. The parameters may include, but are not limited to, information of an account of the user 240 in the key management device 210, information of a bank account of the user 240, information of a cryptographic key management system of the user 240, and association of the user 240 with a key management service, etc. Upon receipt of the request, the key management device 210 may send a confirmation of an acceptance of the request (step 416).

The key management device 210 may further extract and analyze the parameters included in the request and allocate a proper key manager (step 418). In an embodiment, the key management device 210 may allocate a unique key manager to the transaction data by adopting an idempotent control protocol, such that when the key management device 210 analyzes the parameters, the key management device 210 may always allocate the same key manager to that transaction data. The allocated key manager may relay the request for the cryptographic key and the signature to the signature authority 250 (step 420). The signature authority 250 may generate a signature for the transaction data and return the requested cryptographic key and the signature to the key management device 210 (step 422).

Upon receipt of the cryptographic key and the signature, the key management device 210 may broadcast the cryptographic key and the signature (step 422). In an embodiment, before broadcasting the cryptographic key and the signature, the key management device 210 may reformat the signature to adapt to a specific type of a blockchain system or a specific format of a smart contract in the blockchain system.

In an embodiment, the user interface system 230 may receive the broadcasted cryptographic key and the signature (step 424). The user interface system 230 may create an account in the blockchain system 100 and upload the signature to the blockchain system 100 for verification (step 426). In an embodiment, the user interface system 230 may also upload the transaction data with the signature (signed transaction data) to the blockchain system for verification of the accuracy. In an embodiment, the user interface system 230 may receive payload data formed with an original signature and a reformatted signature and upload the payload data to the blockchain system for verification. The blockchain system 100 may send a confirmation of the account creation and the uploading to the user interface system 230 (step 428). The user interface system 230 may send a confirmation of the account creation and the uploading to the user 240 (step 430).

Figure 5:
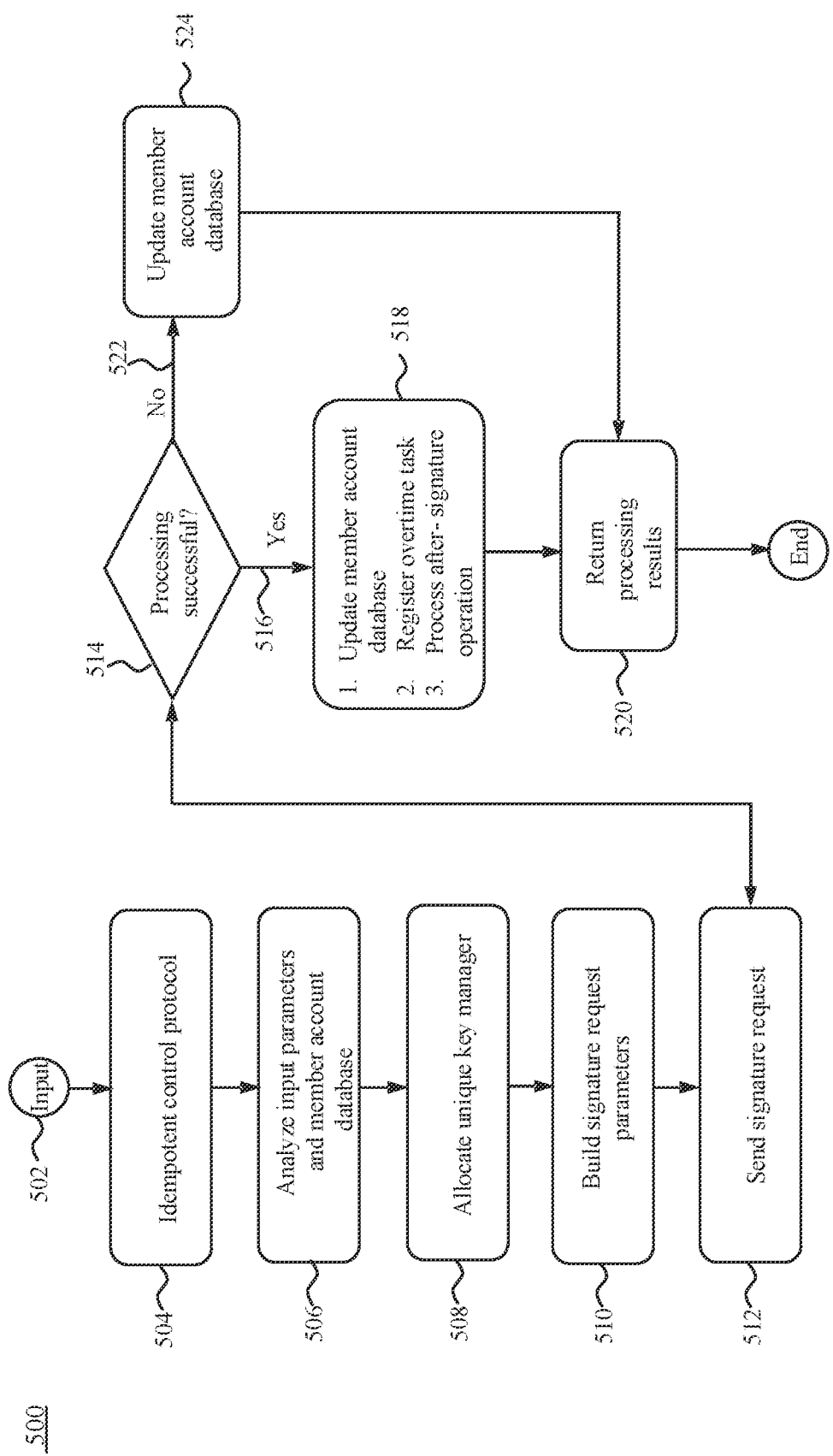
FIG. 5 is a flow chart of a method for managing a cryptographic key and obtaining a signature on transaction data, according to an embodiment.

In the method 400 described above, the key management device 210 manages a cryptographic key and obtains a signature for transaction data for the user 240. Further, the user interface system 230 processes the obtained signature and the cryptographic key, and notifies the user 240. This allows the user 240 to perform transaction and access the account of the user with only a password, without maintaining a cryptographic key, leading to convenient and efficient transaction. The key management device 210 may allocate a unique key manager to given transaction data. This prevents handling of the transaction data by multiple key managers and fraudulent obtaining a signature, leading to enhanced security and efficiency of the transaction. The key management device 210 may reformat obtained signature, so that the signature can be verified in any type of blockchain systems, regardless of its original format, enhancing flexibility of the transaction. Further, a decentralization of the transaction is realized by verifying the obtained signature in the blockchain system, rather than by any central intermediary, further enhancing security and efficiency of the transaction, FIG. 5 is a flow chart of a method 500 for managing a cryptographic key and obtaining a signature on transaction data, according to an embodiment. The method 500 may be performed by a key management device, such as the key management device 210 (FIG. 2). The key management device may include a plurality of key managers that can process a signature request. The key management device may further include a member account database that records information of a user of the key management device.

Referring to FIG. 5, the key management device may receive an input of transaction data and a request for a signature on the transaction data for a user (step 502). In an embodiment, the key management device may process the signature request with an idempotent control protocol, to ensure that the transaction data is assigned to and processed by a unique key manager (step 504). In an embodiment, the key management device may include an idempotent control table that maps a set of parameters to a specific key manager. With this table, the key management device may analyze the parameters included in the signature request and the information of the user in the member account database (step 506). Based on the analysis, the key management device may allocate the unique key manager (e.g., signOperator) for the transaction data (step 508).

In an embodiment, the allocated unique key manager may assemble signature request parameters (e.g., signOperator: buildRequest( )) for a corresponding signature authority (step 510) to obtain a signature from that signature authority. The parameters may be assembled to a format required by that signature authority. Then a signature request is executed (e.g., signOperator.sign( )) and transmitted to the corresponding signature authority (step 512).

In an embodiment, the key management device may determine whether the signature request is successfully processed or not (step 514). If the key management device determines that the signature request is successfully processed (step 516), the key management device may further update the member account database, register an overtime task, and process after-signature operations (e.g., signOperator.afterSign( )) (step 518). In an embodiment, the overtime task occurs when the signature authority does not return the requested signature within a predetermined time period. In this case, a manual intervention may be needed. In an embodiment, the after-signature operations may include reformatting the obtained signature and generating payload data with the original signature and the reformatted signature.

In an embodiment, the processing results are returned to the user (step 520) by outputting the obtained signature and a cryptographic key. For example, the cryptographic key may be a public key, and the signature may be obtained by applying a private corresponding to that public key. On the other hand, if the key management device determines that the signature request is not successfully processed (step 522), the key management device may update the member account database (step 524) and send a message of unsuccessful processing of the signature request to the user (step 520).

By adopting an idempotent control protocol, the transaction data may be always assigned to the same key manager when the transaction data is processed by the key management device. This prevents unnecessary processing of the signature request by multiple key managers, thereby further prevents obtaining an invalid signature, leading to enhanced security and efficiency of the transaction.

Figure 6:
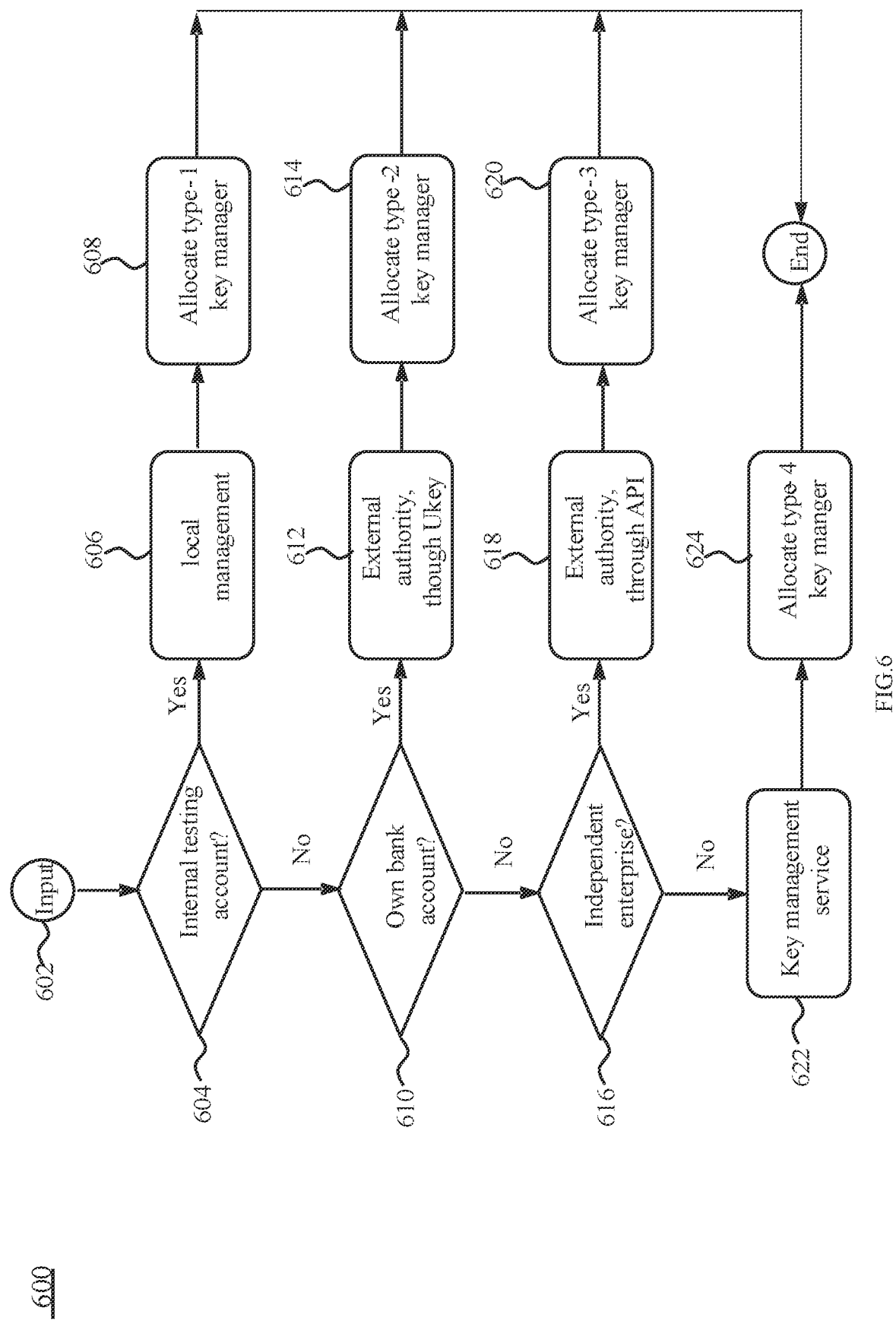
FIG. 6 is a flow chart of a method for allocating a key manager responsive to a signature request, according to an embodiment.

FIG. 6 is a flow chart of a method 600 for allocating a key manager responsive to a signature request, according to an embodiment. The method 600 may be performed by a key management device, such as the key management device 210 (FIG. 2). Referring to FIG. 6, the key management device may receive input data including a signature request for transaction data (step 602). In an embodiment, the signature request may be sent from a user interface device, for example, the user interface device 230 (FIG. 2), corresponding to a user. Upon receipt of the signature request, the key management device may analyze the parameters included in the signature request and determine whether the parameters match an internal testing account (step 604). In an embodiment, the internal testing account is set for testing functionality of the key management device. If the key management device determines that the parameters match the internal testing account, the key management device determines that the request needs to be processed locally (step 606) and allocates a type-1 key manager (step 608). In an embodiment, the type-1 key manager is a mock key manager that may locally generate a cryptographic key and provide a mock signature on the transaction.

On the other hand, in step 604, if the key management device determines that the parameters do not match an internal testing account, the key management device may further determine whether the parameters include bank account information of the user (step 610). In some embodiments, the user's bank account information may be included in the input data other embodiments, if the user has a member account in the key management device, the key management device may extract the bank account information from its database. If the key management device identifies the user's bank account information, the key management device determines that the signature request needs to be sent to an external signature authority using the user's USB key ("Ukey") (step 612) and allocates a type-2 key manager (step 614). In an embodiment, the key management device may allocate the type-2 key manager based on the user's role type and the user's bank ID information. In an embodiment, the signature authority corresponding to the type-2 key manager may be a network bank that connects with users such as enterprises through a network. The Ukey may be directly connected to a computer through a USB (Universal Serial Bus) and the Ukey may play a password authentication function. The type-2 key manager may obtain the signature and a cryptographic key (e.g., a public key) from the network bank through the network using the user's Ukey. In an embodiment, the enterprises that utilize the network bank services may be middle-sized or large-sized enterprises.

On the other hand, in step 610, if the key management device fails to identify the user's bank account information, the key management device may further determine whether the user is an independent enterprise who has its own cryptographic key management system (step 616). In an embodiment, an independent enterprise may be a large core business or financial institution that maintains its cryptographic keys in its system. If the key management device determines that the user is an independent enterprise, the key management device may understand that the signature request needs to be sent externally though an application programming interface (API) connector (step 618) and allocate a type-3 key manager (step 620). In an embodiment, the type-3 key manager may initiate connection with the independent enterprise through the API connector and obtain the signature and a cryptographic key (e.g., a public key).

On the other hand, in step 616, if the key management device determines that the user is not an independent enterprise, the key management device may understand that the user may utilize a key management service (step 622) and allocates a type-4 key manager (step 624). In an embodiment, the type-4 key manager may request from the key management service a cryptographic key on behalf of the user. For example, the type-4 key manager may request a pair of private/public keys and generate a signature for the transaction data.

In an embodiment, the key management device may format signatures obtained from different signature authorities so that the signatures may have the same format regardless of their different original formats from the different sources. In this way, the key management device may obtain and provide a signature with a format compatible to any types of blockchain systems or any formats of smart contracts in the blockchain systems, leading to enhanced flexibility and efficiency of the transaction.

Figure 7:
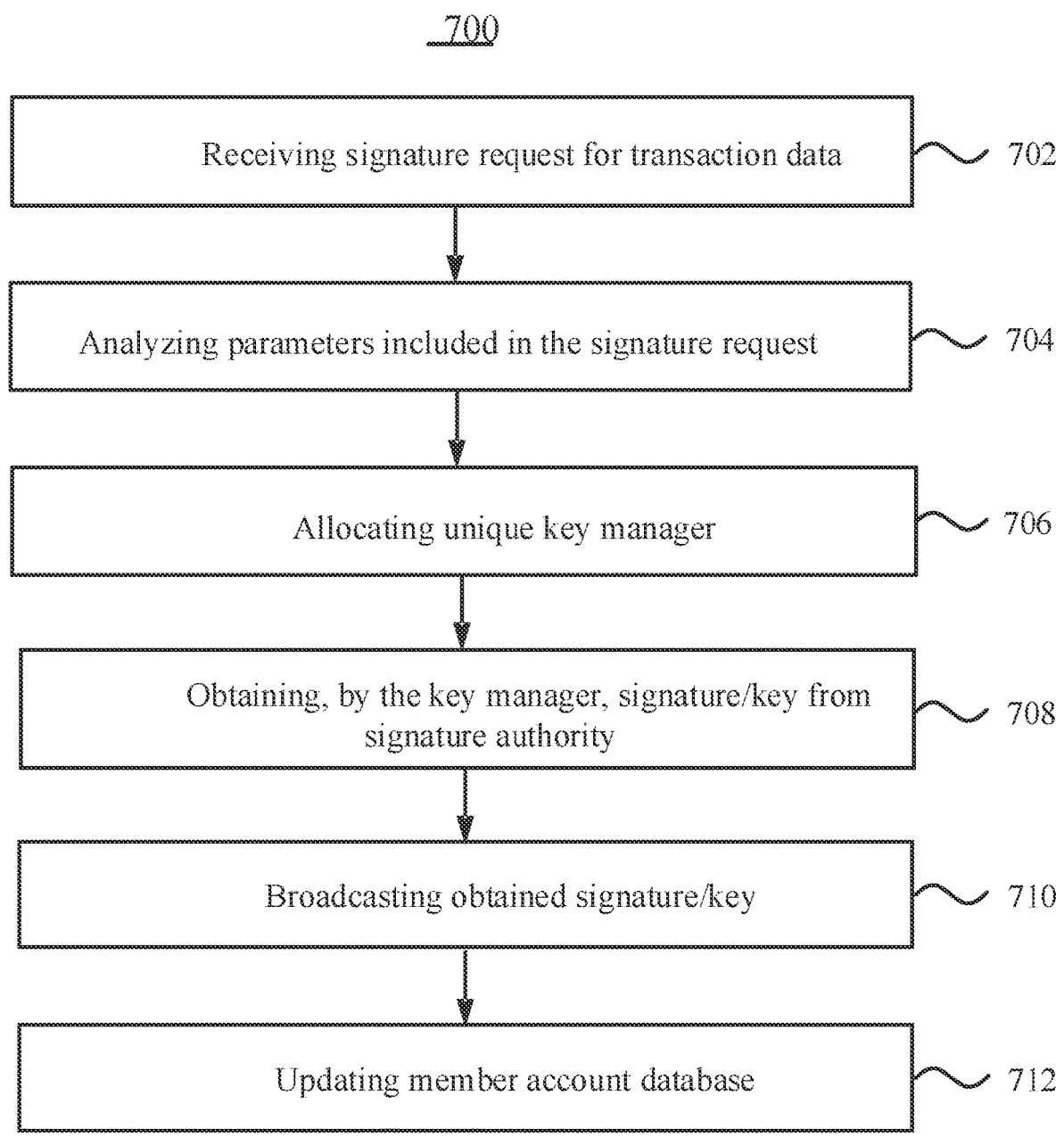
FIG. 7 is a flow chart of a method for managing a cryptographic key and obtaining a signature on transaction data, according to an embodiment.

FIG. 7 is a flow chart of a method 700 for managing a cryptographic key and obtaining a signature on transaction data, according to an embodiment. For example, the method 700 may be performed by a key management device, such as the key management device 210 illustrated in FIG. 2. Referring to FIG. 7, the key management device may receive a request for a signature on transaction data (step 702). In some embodiments, the signature request ay include the transaction data and parameters related to a user of the transaction.

The key management device may extract and analyze the parameters included in the signature request (step 704). Based on the analysis, the key management device may identify and allocate a unique key manager for the transaction data (step 706). In an embodiment, the key management device may allocate the key manager based on the method 600 (FIG. 6). The allocated key manager may initiate contact with a corresponding signature authority and obtain the signature and a cryptographic key from the signature authority (step 708). Upon receipt of the signature and the cryptographic key, the key management device may broadcast the obtained signature and cryptographic key (step 710) so that the user interface system that sent the signature request may receive the broadcasted signature and cryptographic key. The key management device may further update the user's information in a member account database based on the obtained signature and cryptographic key (step 712).

In an embodiment, the allocated key manager may be unique to the transaction or the analyzed parameters, such that when the parameters are analyzed by the key management device, the key management device may always allocate the same key manager for the transaction data. In an embodiment, this unique allocation may be ensured by the method 500 (FIG. 5). By uniquely allocating the key manager, unnecessary processing of the signature request by multiple key managers is prevented.

Figure 8:
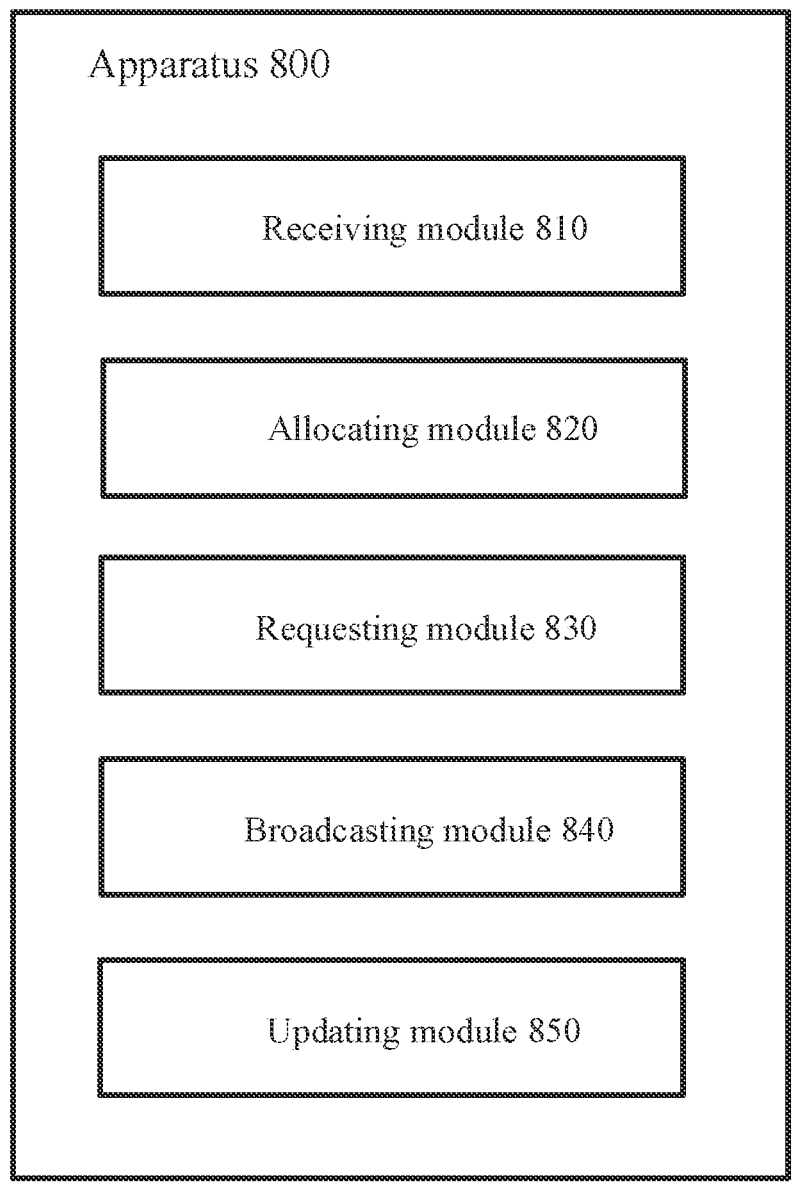
FIG. 8 is a schematic diagram of an apparatus for managing a cryptographic key and obtaining a signature on transaction data, according to an embodiment.

FIG. 8 is a schematic diagram of an apparatus 800 for managing a cryptographic key and obtaining a signature for transaction data, according to an embodiment. For example, the apparatus 800 may be an implementation of a software process, and may correspond to the method 700 (FIG. 7). As shown in FIG. 8, the apparatus 800 may include a receiving module 810, an allocating module 820, a requesting module 830, a broadcasting module 840, and an updating module 850.

The receiving module 810 receives a signature request for transaction data. The allocating module 820 analyzes the parameters in the signature request and, based on the analysis, allocates a key manager for the transaction data. The requesting module 830, that is implemented in the allocated key manager, requests a signature and a cryptographic key from a corresponding signature authority. Upon receipt of the signature and the cryptographic key, the broadcasting module 840 broadcasts the obtained signature and cryptographic key. The updating module 850 updates a user's information in a database based on the obtained signature and cryptographic key.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 800 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 800, references can be made to corresponding steps in the above-described methods. Details are omitted here for simplicity.

In an embodiment, there is also provided a computer program product. The computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments thereof, it is evident that many alternatives, modifications and variations will be apparent to those skilled in the art. Accordingly, the following claims embrace all such alternatives, modifications and variations that fall within the terms of the claims.

The invention claimed is:

1. A system for obtaining a signature on transaction data, comprising:
one or more processors; and
a memory storing instructions that, when executed by the one or more processors, cause the one or more processors to perform:
receiving a request for the signature on the transaction data; and
causing allocation of a key manager for blockchain, comprising:
analyzing parameters associated with the request;
if the parameters are associated with an internal testing account,
allocating a first key manager;
generating, by the first key manager, a mock cryptographic key for testing, wherein the mock cryptographic key includes a private key; and
obtaining, by the first key manager, a first signature as the signature on the transaction data, with the mock cryptographic key; and
if the parameters are not associated with an internal testing account and the parameters are associated with bank account information,
allocating a second key manager associated with a network bank; and
obtaining, by the second key manager, a second signature as the signature on the transaction data and a public cryptographic key corresponding to the second signature.

2. The system of claim 1, wherein the causing of the allocation of the key manager further comprises:
if the parameters are not associated with an internal testing account, the parameters are not associated with the bank account information, and the request includes information of an independent enterprise that owns a cryptographic management system, allocating a third key manager; and
obtaining, by the third key manager from the independent enterprise, a third signature as the signature on the transaction data and a public cryptographic key corresponding to the third signature.

3. The system of claim 2, wherein the causing of the allocation of the key manager further comprises:
if the parameters are not associated with an internal testing account, the parameters are not associated with the bank account information, and the request does not include the information of the independent enterprise, allocating a fourth key manager; and
obtaining, by the fourth key manager from a key management service, a fourth signature as the signature on the transaction data and a public cryptographic key corresponding to the fourth signature.

4. The system of claim 1, wherein the one or more processors are further caused to perform:
reformatting the obtained signature on the transaction data.

5. The system of claim 1, wherein the one or more processors are further caused to perform:
broadcasting the obtained signature on the transaction data and the obtained public cryptographic key; and
updating a member account database.

6. The system of claim 5, wherein the one or more processors are further caused to perform:
identifying and registering an overtime task,
wherein the overtime task occurs when the signature on the transaction data is not obtained within a predetermined time period.

7. The system of claim 1, wherein the second key manager obtains the signature on the transaction data and the cryptographic key from the network bank using a USB key of a user.

8. The system of claim 2, wherein the third key manager obtains the signature on the transaction data and the cryptographic key from the independent enterprise through an application programming interface connector.

9. The system of claim 1, wherein the one or more processors are further caused to perform:
creating an account in a blockchain system; and
uploading the obtained signature on the transaction data to the blockchain system for verification.

10. The system of claim 1, wherein the causing of the allocation of the key manager is performed based on an idempotent control protocol.

11. A non-transitory computer-readable medium having stored therein instructions that, when executed by a processor of a device, cause the device to perform:
receiving a request for a signature on transaction data; and
causing allocation of a key manager for blockchain, comprising:
analyzing parameters associated with the request;
if the parameters are associated with an internal testing account,
allocating a first key manager;
generating, by the first key manager, a mock cryptographic key for testing, wherein the mock cryptographic key includes a private key; and obtaining, by the first key manager, a first signature as the signature on the transaction data, with the mock cryptographic key; and if the parameters are not associated with an internal testing account and the parameters are associated with bank account information, allocating a second key manager associated with a network bank; and obtaining, by the second key manager, a second signature as the signature on the transaction data and a public cryptographic key corresponding to the second signature.

12. The non-transitory computer-readable medium of claim 11, wherein the causing of the allocation of the key manager further comprises:

if the parameters are not associated with an internal testing account, the parameters are not associated with the bank account information, and the request includes information of an independent enterprise that owns a cryptographic management system, allocating a third key manager; and obtaining, by the third key manager from the independent enterprise, a third signature as the signature on the transaction data and a public cryptographic key corresponding to the third signature.

13. The non-transitory computer-readable medium of claim 12, wherein the causing of the allocation of the key manager further comprises:

if the parameters are not associated with an internal testing account, the parameters are not associated with the bank account information, and the request does not include the information of the independent enterprise, allocating a fourth key manager; and obtaining, by the fourth key manager from a key management service, a fourth signature as the signature on the transaction data and a public cryptographic key corresponding to the fourth signature.

14. The non-transitory computer-readable medium of claim 11, the device further being caused to perform:

reformatting the obtained signature on the transaction data.

15. The non-transitory computer-readable medium of claim 11, the device further being caused to perform:

broadcasting the obtained signature on the transaction data and the obtained public cryptographic key; and updating a member account database.

* * * * *